United States Patent [19]

Nunes, Jr.

[11] 4,179,770
[45] Dec. 25, 1979

[54] TURF GROOMING VEHICLE WITH DISCHARGEABLE RECEIVER

[76] Inventor: John F. Nunes, Jr., c/o Nunes Mfg. Co., 2006 Loquot Ave., Patterson, Calif. 95363

[21] Appl. No.: 887,657

[22] Filed: Mar. 17, 1978

Related U.S. Application Data

[62] Division of Ser. No. 703,632, Jul. 8, 1976, abandoned.

[51] Int. Cl.² ............................................. A47L 5/30
[52] U.S. Cl. .................................................. 15/360
[58] Field of Search ........................ 15/354, 359, 360

[56] References Cited

U.S. PATENT DOCUMENTS

| 2,932,845 | 4/1960 | Rydberg | 15/354 X |
| 3,172,143 | 3/1965 | Yucis et al. | 15/354 X |

FOREIGN PATENT DOCUMENTS 1068939  5/1967  United Kingdom ...................... 15/354

*Primary Examiner*—Christopher K. Moore
*Attorney, Agent, or Firm*—Flehr, Hohbach Test, Albritton & Herbert

[57] ABSTRACT

A turf grooming vehicle including a chassis and wheels supporting the chassis in terrain-following movement across a field includes a vacuum head assembly and a bin forming a receiver for loose turf material vacuumed from the surface of a field of turf. By jacking the receiver upwardly to pivot about an elevated axis of rotation the contents thereof can be discharged over the side of and into a vehicle disposed alongside the chassis. In addition, means forming a drive connection for operating both a fan for creating the suction as well as for operating hydraulic means for driving a rotatable grooming unit is coupled to a tractor or other pulling means so that the tractor and trailer can make extremely sharp turns. Further, the vacuum head assembly is arranged whereby it follows the surface of the ground independently of upward movements of the chassis (such as may be derived from the upward movements of the chassis wheels). Finally, means are arranged for evenly lifting and lowering opposite ends of the vacuum head assembly into and out of operative relation with the ground.

1 Claim, 18 Drawing Figures

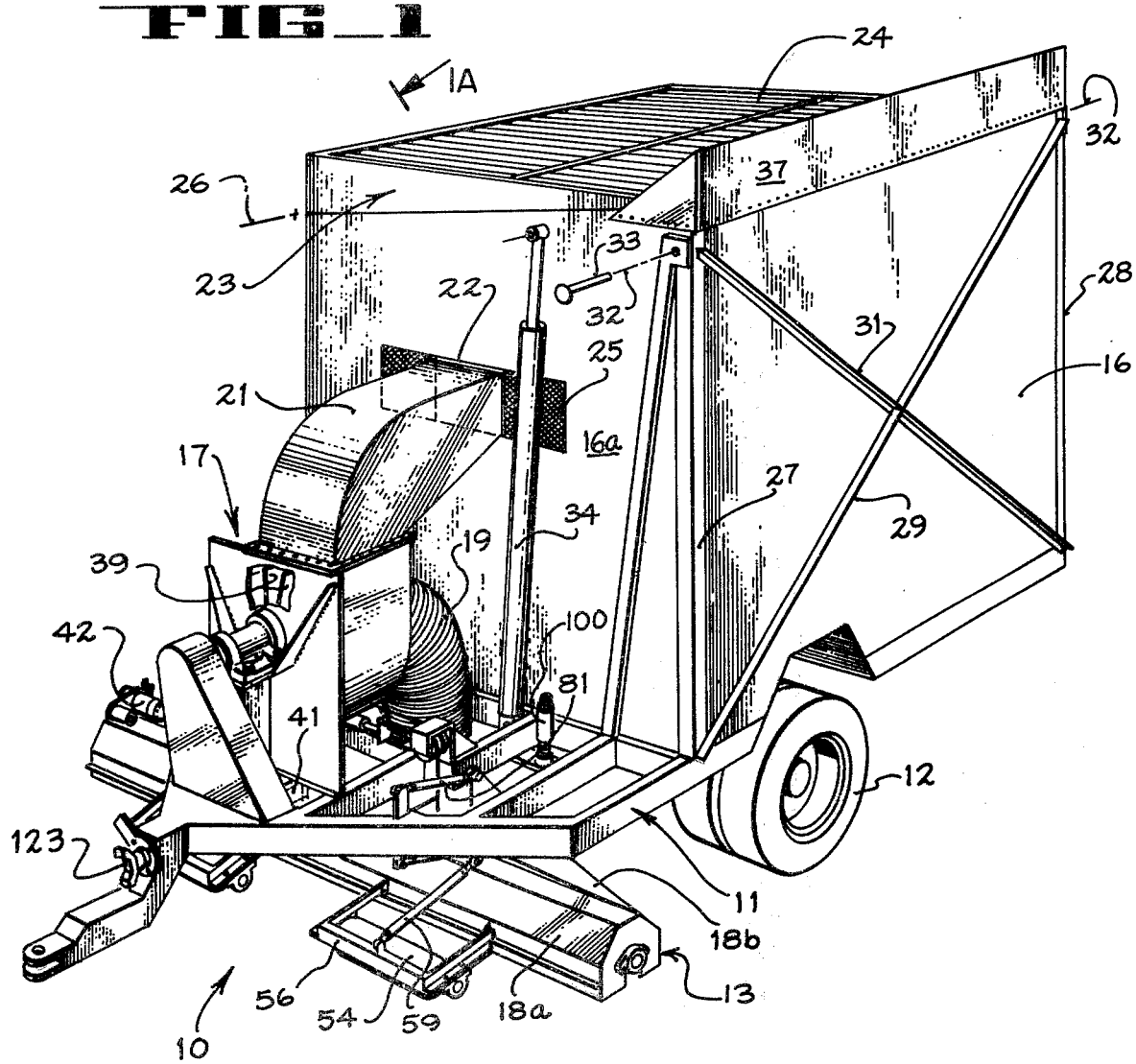
FIG_1
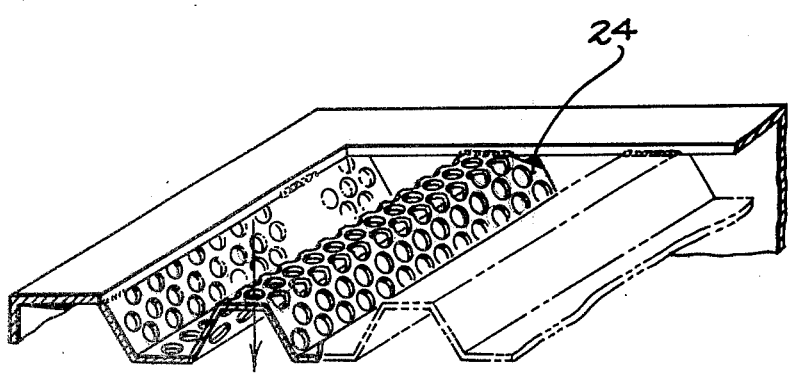
FIG_1A

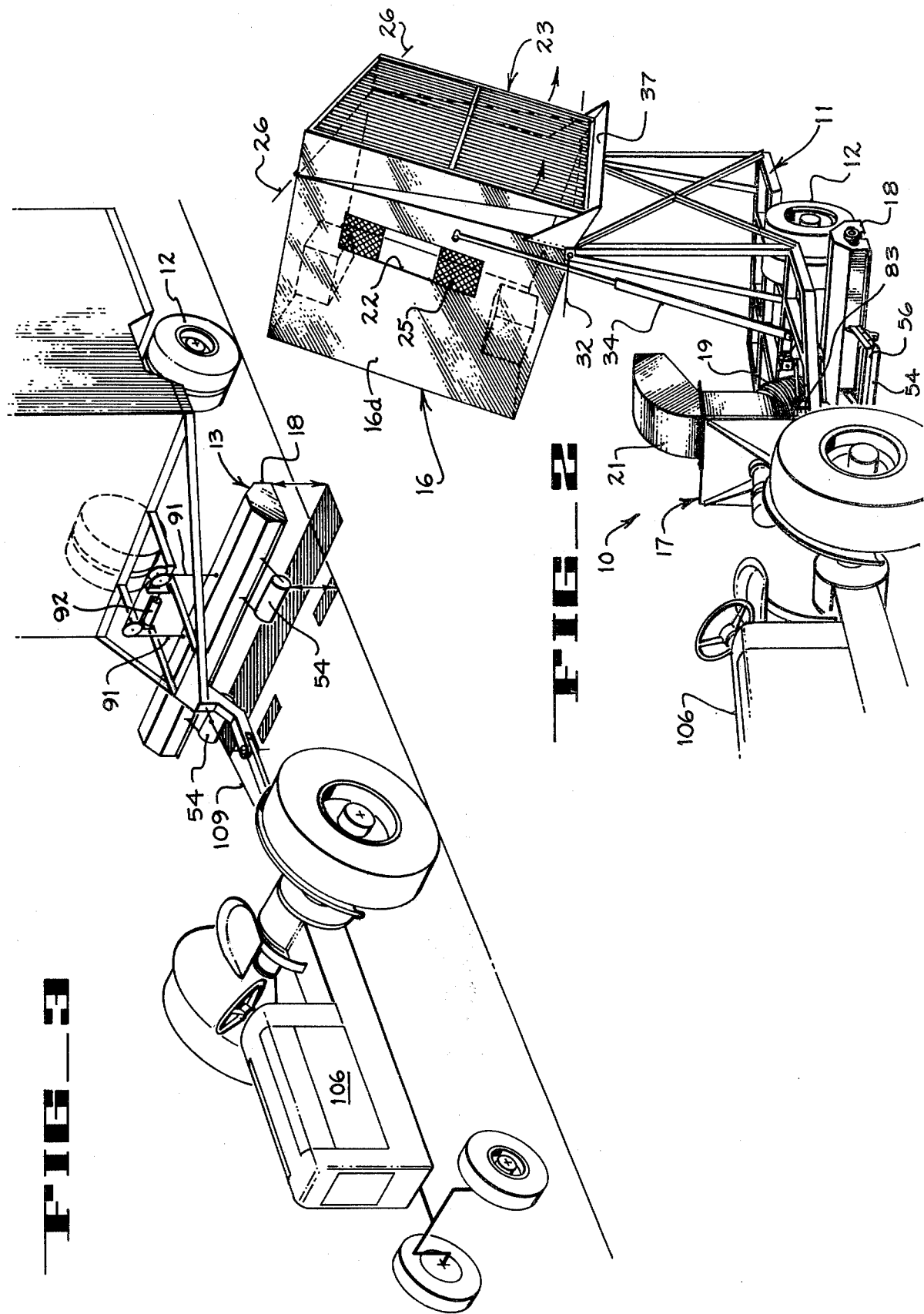

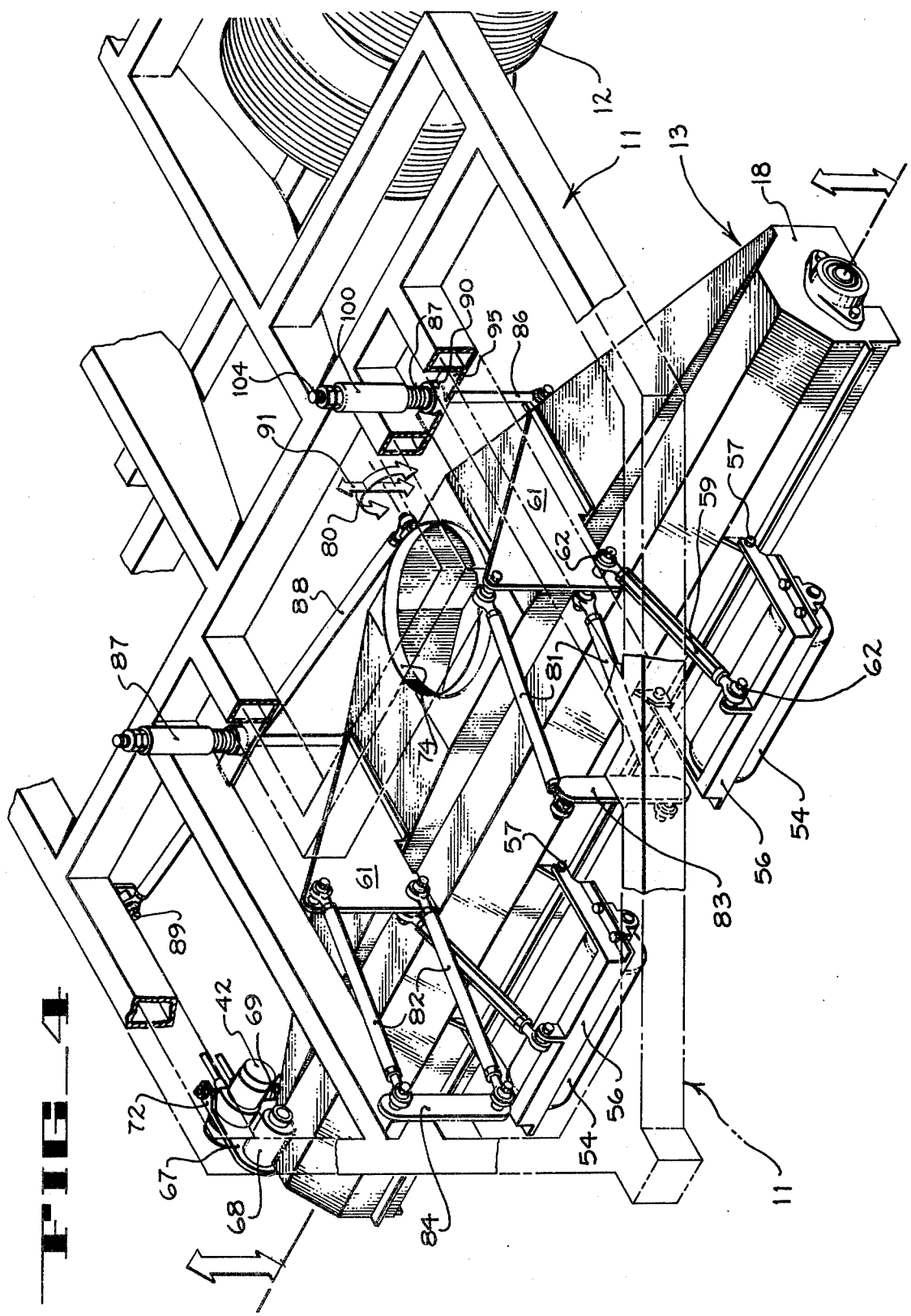

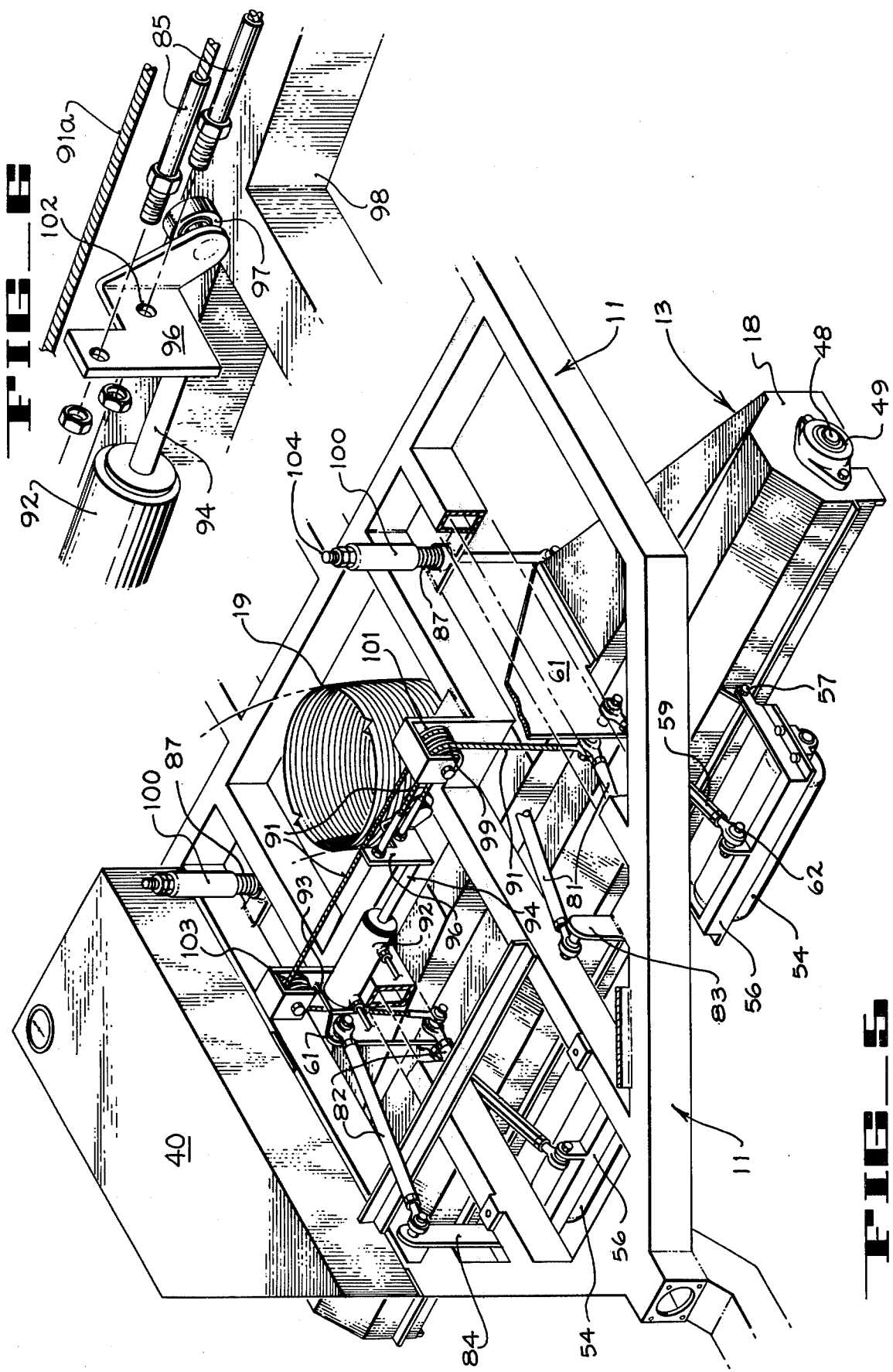

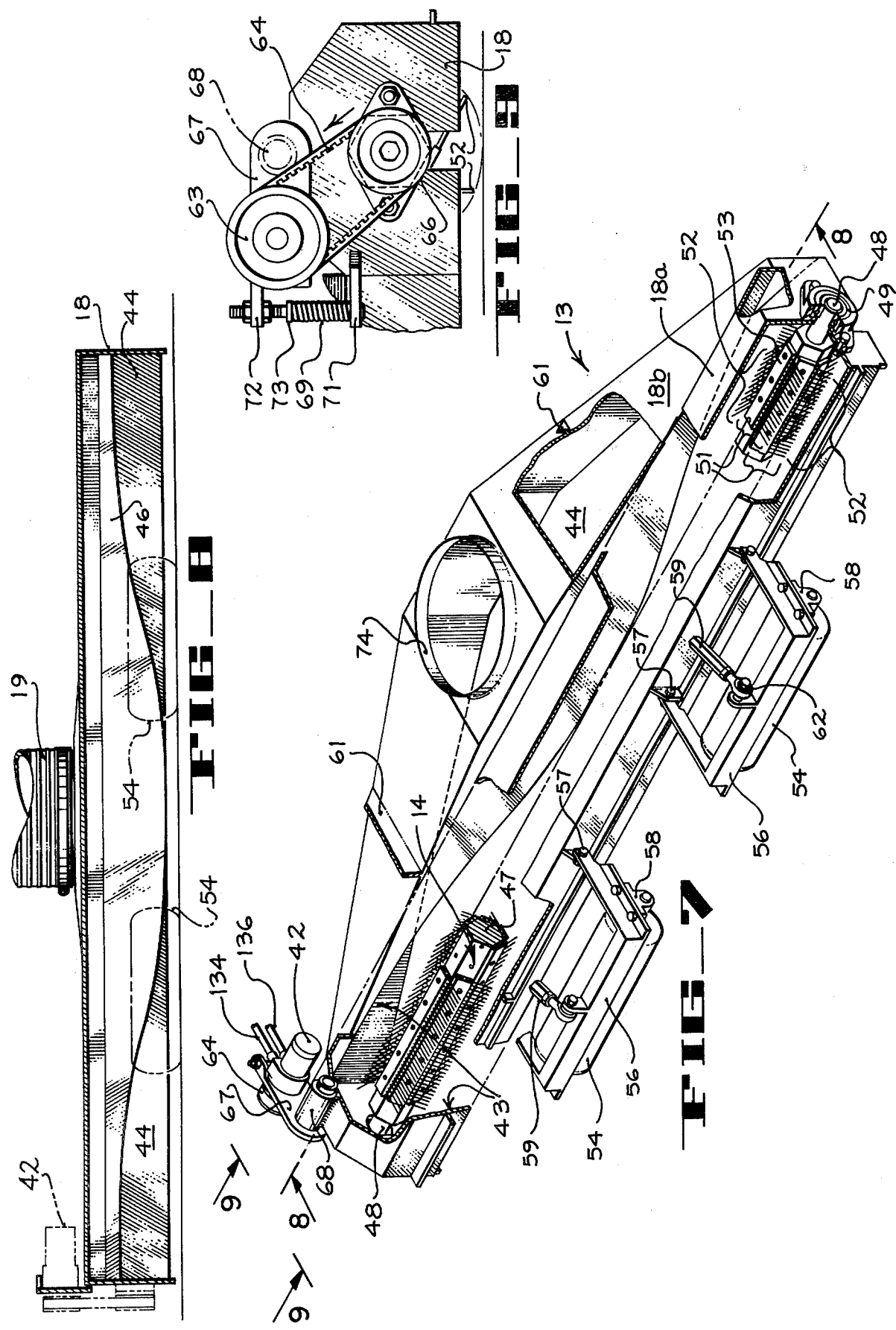

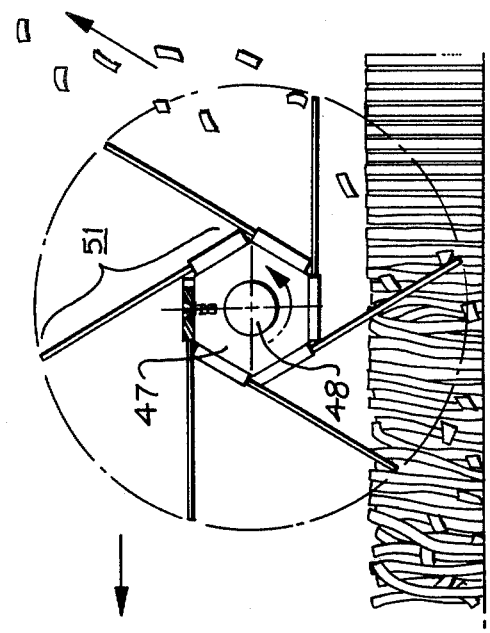
FIG_10
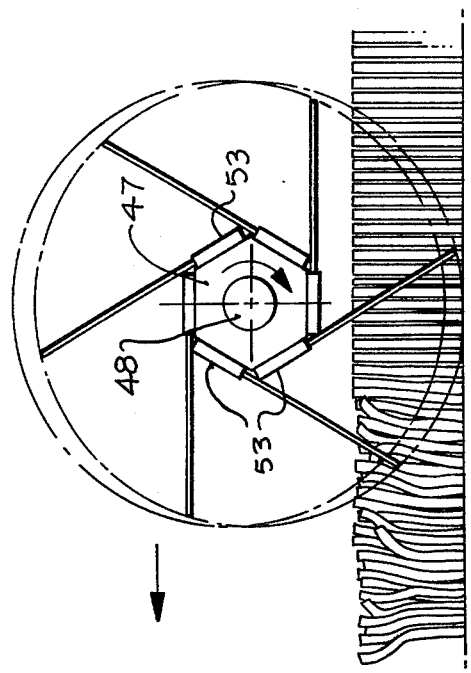
FIG_11
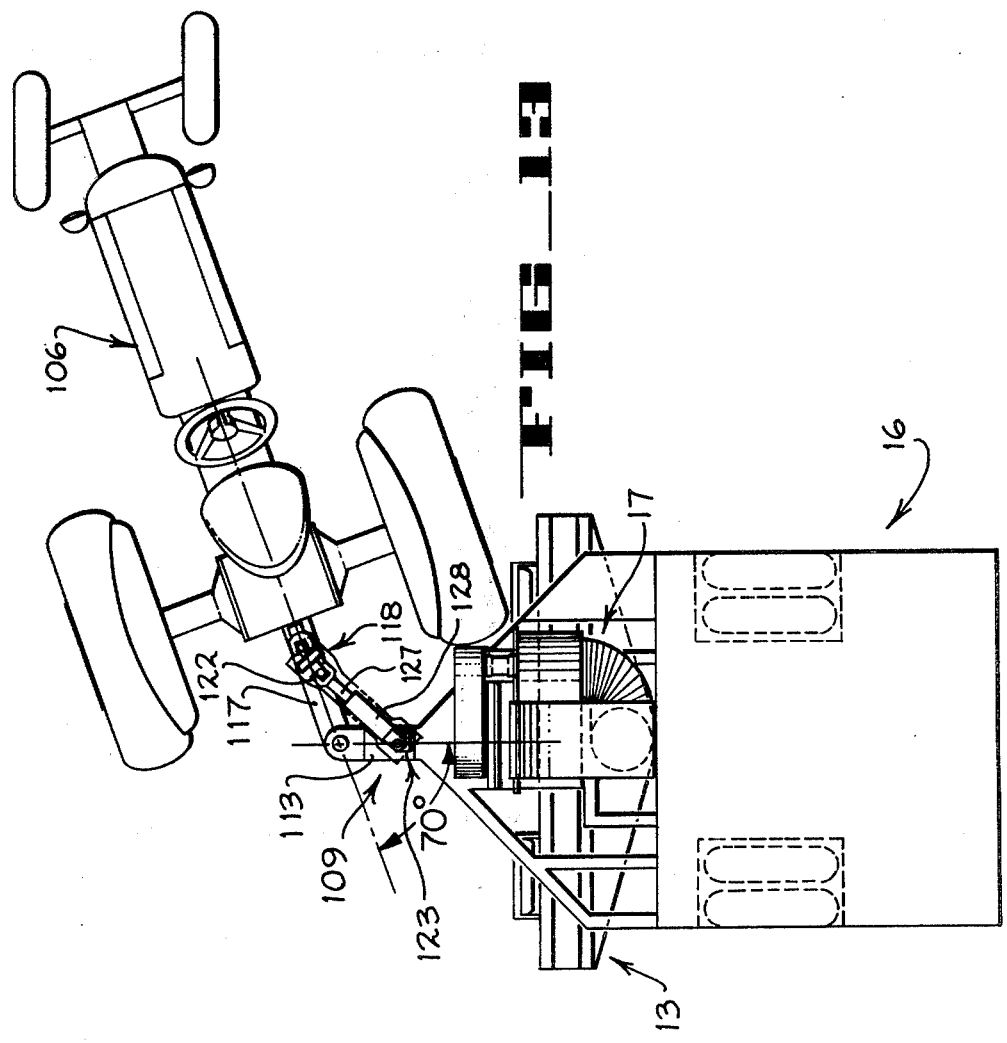
FIG_13

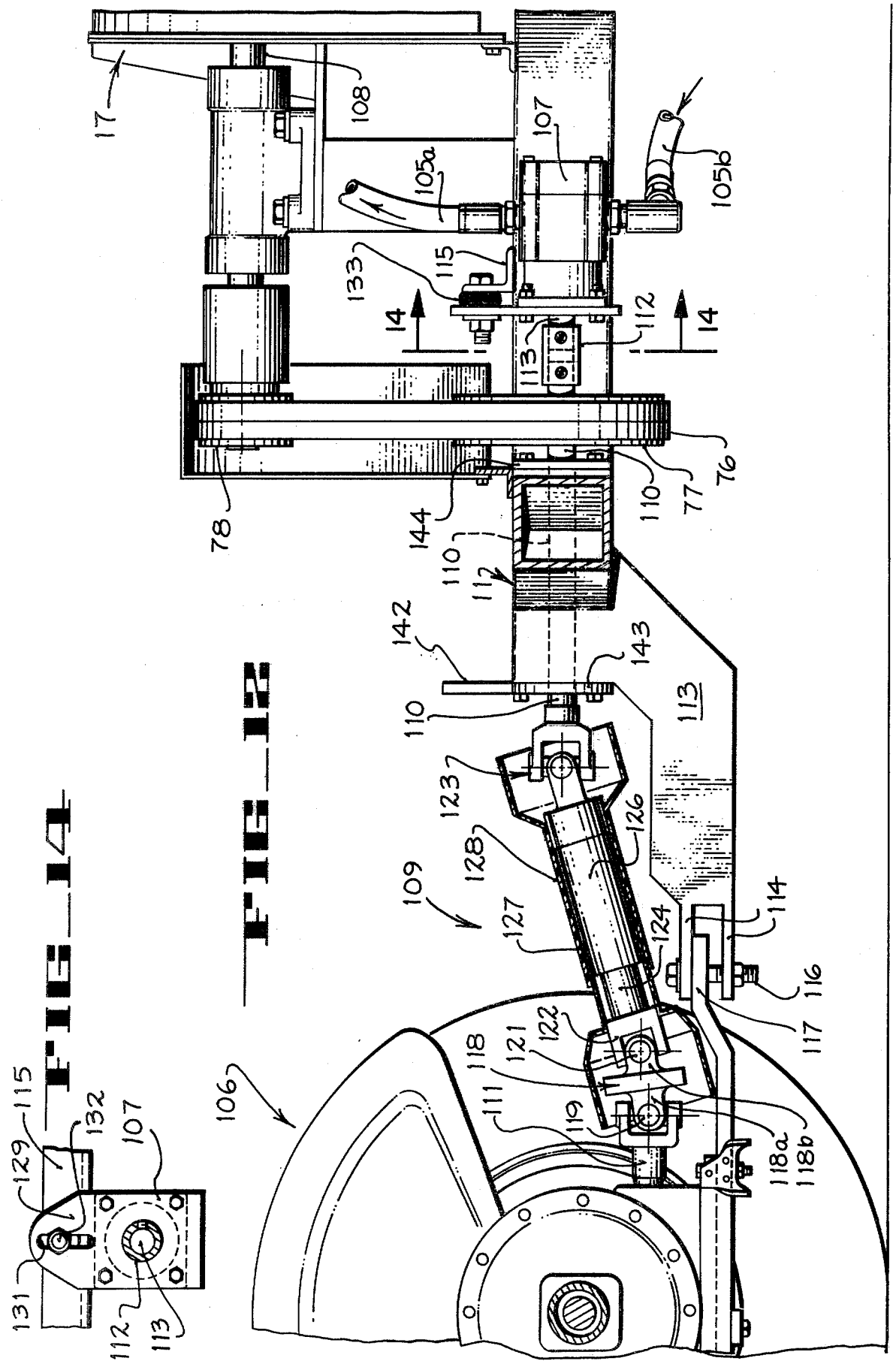

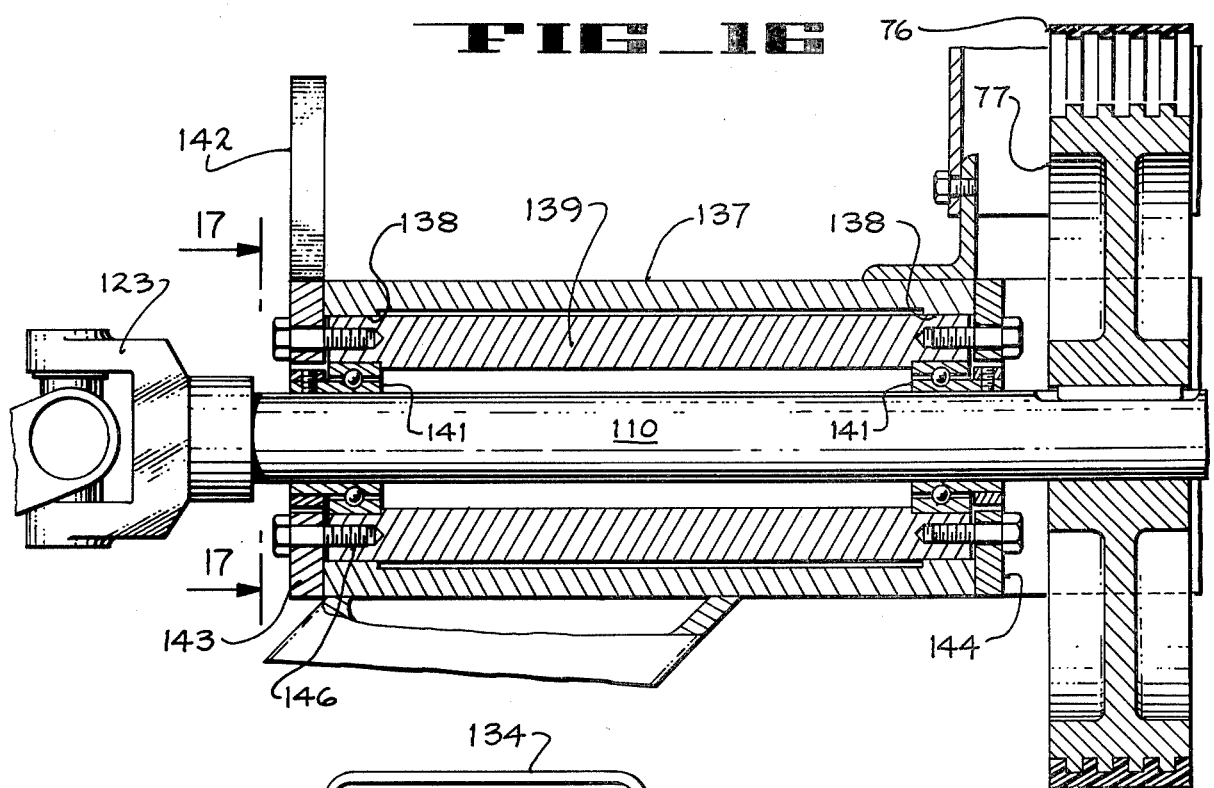
FIG_16
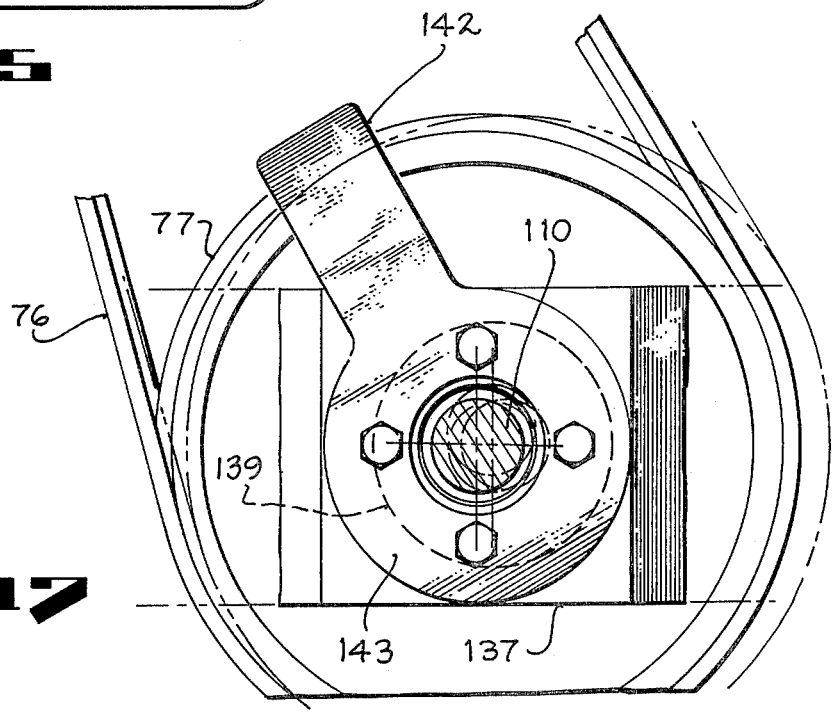
FIG_15
FIG_17

TURF GROOMING VEHICLE WITH DISCHARGEABLE RECEIVER

This is a division of application Ser. No. 703,632, filed July 8, 1976, now abandoned.

BACKGROUND OF THE INVENTION

This invention pertains to agricultural equipment and more particularly to a turf grooming vehicle of a type particularly useful in sweeping clippings and other loosened turf material from the foliage of a field of turf or the like. This invention also pertains to a vehicle for renovating the condition of the turf by loosening accumulated dead turf material.

Previous turf grooming machines have been limited substantially to sweeping machines of a type which sweep clippings from the surface of a field and discharge them into a basket or other type of collecting device which in turn is emptied into other containers located nearby the ends of the field for ultimate dumping into a truck to be carried away.

In addition, as a sweeper type machine moves across a field there are obviously high spots and low spots in the field to be encountered by the sweeping mechanism. In previous arrangements where the sweeping mechanism is secured directly to the chassis, as it moves across the field it will tend to gouge those high spots and pass too far above the low spots to accomplish an effective sweeping of all of the field since the sweeper unit moves in response to the upward chassis movements.

SUMMARY OF THE INVENTION AND OBJECTS

In general, there is provided a turf grooming vehicle having a mobile chassis of a type adapted to move across a field of turf. Grooming means including a vacuum head assembly carried by the chassis in position to apply a vacuum to the field of turf serves to remove loosened turf material such as clippings, dead grass, dead roots and the like from the field. A container carried by the chassis receives the discharged material and is arranged to be movable between retracted and advanced positions for loading and discharging the material into and out of the container. Turf material is discharged into the container from a flow passage leading out of the vacuum head assembly. A closure for the container hinged to an edge region thereof permits the closure to pivot about a first axis between closed and opened positions whereby the contents of the container can be discharged when the closure is in its opened position. Means for discharging the contents of the container include support means carried by the chassis and pivotally coupled to the container to permit the container to pivot about a second axis disposed in spaced relation from the first axis. Means for moving the container from retracted to advanced positions so as to move the container to pivot about the second axis to a position whereby the closure moves about its first axis to an opened position serves to permit the contents of the container to be discharged while so moved.

In addition to the foregoing, the vacuum head assembly is carried by the chassis in a manner whereby it moves in terrain-following movement independently of upwardly directed movements of the chassis derived from the movements of supporting wheel carrying the chassis. Thus, the movement of the head assembly is substantially unaffected by upward movements of the wheels and the chassis which the wheels support.

In general, it is an object of the present invention to provide an improved turf grooming vehicle which is particularly advantageous in reducing the number of steps involved in sweeping a field of clippings and other loose turf material.

Another object of the invention is to provide a turf grooming vehicle capable of being towed around extremely sharp corners up to an angle, for example on the order of 70°.

Another object of the invention is to provide a turf grooming vehicle in which a vacuum head assembly for retrieving loose turf materials is supported in spaced terrain-following movement by adjustable means which can serve to increase or decrease the spacing, and in a manner whereby the upward movements of the vacuum head assembly can remain independent of upward movements of the chassis per se.

Another object of the invention is to provide a turf grooming vehicle of the kind described in which a vacuum head assembly remains continuously coupled to be lifted substantially above the surface of the field by yieldable connecting means while the vacuum head assembly continues to advance in sweeping relation with the turf.

It is another object of the invention to provide a machine of the kind described in which a belt drive assembly can be readily tightened by operators in the field so as to minimize "down-time" caused by loss of tension in the drive belt.

The foregoing and other objects of the invention shall become more readily evident from the following detailed description of a preferred embodiment when considered in conjunction with the drawings.

BRIEF DESCRIPTION OF THE DRAWINGS

FIG. 1 shows a perspective view of a turf grooming vehicle with its turf receiving container in retracted position, according to the invention;

FIG. 1A shows an enlarged detail view, in perspective, of a portion of the top of the receiving container;

FIG. 2 shows a perspective view of a turf grooming vehicle as shown in FIG. 1 with a turf receiving container articulated to its advanced position for discharge, according to the invention;

FIG. 3 shows a diagrammatic perspective view of a turf grooming vehicle and tractor pulling same, according to the invention;

FIG. 4 shows a diagrammatic perspective view of a portion of the chassis of the turf grooming vehicle of FIG. 1 showing a vacuum head assembly and supporting means coupled between the chassis and the vacuum head assembly for independently supporting same, according to the invention;

FIG. 5 shows a diagrammatic perspective view with portions broken away showing means for lifting the vacuum head assembly substantially clear of the ground, according to the invention;

FIG. 6 shows an enlarged exploded detail view of a portion of FIG. 5;

FIG. 7 shows a vacuum head assembly, with portions broken away for clarity, according to the invention;

FIG. 8 shows an elevation section view taken along the line 8—8 of FIG. 7;

FIG. 9 shows a side elevation view taken along the line 9—9 of FIG. 7;

FIGS. 10 and 11 show diagrams representing an elevation view of a grooming device carried within the vacuum head assembly to be operated respectively in opposite directions for sweeping or renovating the turf;

FIG. 12 shows a side elevation section view of the drive coupling arrangement, according to the invention, as disposed between the tractor and turf grooming vehicle;

FIG. 13 shows a plan view of a diagram of a turf grooming vehicle and tractor coupled thereto for towing, according to the invention;

FIG. 14 shows an elevation detail view taken along the line 14—14 of FIG. 12;

FIG. 15 shows a diagram of the hydraulic circuitry, according to the invention;

FIG. 16 shows a longitudinal section view of a belt tightening drive connection, according to the invention; and FIG. 17 shows a transverse section view taken along the line 17—17 of FIG. 16.

DETAILED DESCRIPTION OF A PREFERRED EMBODIMENT

As generally shown in FIG. 1 a turf grooming vehicle 10 is provided having a mobile chassis 11 supported to move across a field of turf by means of wheels 12. Wheels 12 are mounted in conventional style whereby the vertical movements of wheels 12 are transmitted directly to chassis 11 in terrain-following movement. Turf grooming means including a vacuum head assembly 13 carried by chassis 11 serves to apply a vacuum to the field of turf for removing loose turf material therefrom. A rotating sweeper unit 14 (FIG. 7) as illustrated diagrammatically in FIGS. 10 and 11 moves in advance of the suction and serves to sweep the foliage of the turf to release loose turf material therefrom. Chassis 11 carries vacuum head assembly 13 in a particular manner described further below whereby the upward movements applied to head assembly 13 as it rides on and follows the terrain will be substantially unaffected by upward movements of chassis 11 and wheels 12.

Chassis 11 carries a bin 16 for receiving turf material vacuumed from the surface of a field by means of the fan assembly 17. As represented herein the term "loose turf material" is intended generally to pertain to the clippings remaining after mowing a field of turf, dead blades of grass, and dead root structure which can be removed by renovating or sweeping the turf, leaves falling upon the turf which are desired to be removed, and the like.

It has been observed that maximum air flow through bin 16 serves to enhance the capacity of head assembly 13 for vacuuming the turf. Thus, as noted below, screened window extensions 25 and the pervious metal screen 24 forming closure 23 serve to relieve any build-up of back pressure against conduit 21. This permits a high volume of air to be blown into and out of bin 16 to provide enhanced vacuum beneath assembly 13 for maximum entrainment of loose turf material.

Means forming a flow passage from vacuum head assembly 13 through fan assembly 17 discharges the material into bin or container 16 via the trailing portion 18b of the head assembly housing 18 and upwardly through the flexible conduit 19 to fan assembly 17. Fan assembly 17 discharges a flow of air and the entrained material via a discharge conduit 21 into bin 16 via the opening 22 formed through the wall of bin 16.

In order to permit air to flow freely into and out of bin 16, a top closure 23 or lid is formed with a pervious material, such as the metal screen 24 (FIG. 1A) with openings 30 in addition to the screened window extensions 25 of window 22 to form outlet flow passages. Thus, air can escape to prevent the build-up of back pressure within bin 16 but the material blown into bin 16 will be retained. Closure 23 is hinged to the upper edge region of bin 16 so as to pivot about the axis 26 between closed and opened positions. Support means, in the form of the braced uprights, extend upwardly from chassis 11 and are strengthened by means of the crossbraces 29, 31 such as of angle bar material. Pivot means 33 carried at the upper end region of the braced uprights 27, 28 serve to couple bin 16 to pivot about axis 32 at a position substantially elevated above chassis 11 and disposed in lateral relation from axis 26.

Means for moving bin 16 from a retracted to an advanced position for discharging the contents thereof, such as shown in FIG. 2, includes an extensible jack 34 coupled at its lower end to chassis 11 and at its upper end to the side wall of bin 16 so as to define a lever arm (about pivot axis 32) represented by the phantom line 36 (FIG. 1). Accordingly, bin 16 can be hoisted from a lowered to an elevated position (FIG. 2) to move about pivot axis 32 to a position beyond the vertical plane 35 taken upwardly through axis 32 so as to cause closure 23 to swing to the right, as shown, to an open position to discharge the contents thereof while elevated. Thus, it is possible to provide a truck in position alongside the vehicle for easily receiving the contents of bin 16. In order to assist the transfer from bin 16 to a truck disposed alongside, a semi-rigid lip 37 is provided.

It is to be observed that opening 22 forming part of the flow passage between vacuum head assembly 13 and bin 16 is disposed at a region of bin 16 to be aligned with discharge conduit 21, i.e., the output from head assembly 13 as bin 16 is disposed at its lowered position. However, movement of bin 16 de-couples opening 22 from the flow passage of conduit 21 to de-couple the bin 16 from vacuum head assembly 13 at such time.

As will be described in more detail further below a universal power take-off yoke 123 serves to drive a fan 39 disposed within the housing of fan assembly 17. In addition, power take-off yoke 123 further serves to operate the hydraulic pumping means 41 for operating the hydraulic motor 42.

Vacuum head assembly 13 (FIG. 7) includes a housing 18 open at the bottom to be directed downwardly toward the turf for applying a vacuum to the turf to remove loose turf material as vacuum head assembly 13 moves across a field. Housing 18 includes a sweeper compartment 43 and a low pressure vacuum compartment 44 formed within housing 18. As shown in FIG. 7 sweeper compartment 43 is disposed in advance of vacuum compartment 44 and includes sweeping means carried on an axle 47 mounted for rotation within sweeper compartment 43 for loosening turf material from the field. A downwardly depending dividing curtain 46 serves to separate the two compartments. Curtain 46 is formed with a lower edge which serves to increasingly provide more spacing between the bottom edge of the curtain and the turf at positions progressively remote from the center of the curtain for evenly distributing the suction applied to sweeper compartment 43 from vacuum compartment 44. Thus, the lower edge of curtain 46 is curved to provide substantially more clearance between the bottom thereof at the ends of curtain 46 than at the center.

Cyclically driven turf grooming means disposed within sweeper compartment 43 includes the hexagonally shaped axle 47 mounted for rotation by stub shafts 48 carried in bearings 49. The turf grooming means is characterized by a plurality of comb units 51 carried by axle 47. Each comb unit 51 includes a number of teeth 52 disposed to extend generally tangentially away from axle 47. Comb units 51 are disposed at spaced positions around axle 47 and oriented to direct the teeth of each comb unit in a common direction from axle 47 to permit teeth 52 to pass through and to engage the foliage of the turf when axle 47 is rotated. Accordingly, comb units as shown in FIG. 7 each comprise an elongate substantially flat mounting head or block 53 (FIG. 10) of resilient material attached to one of the flat sides of axle 47. Each mounting head supports a series of teeth embedded therein or otherwise captured therein so as to provide the elongate teeth 52. Preferably teeth 52 are resiliently mounted in block 53 whereby they can bend to some limited degree as they are passed through the foliage of the turf so as to avoid breaking when encountering a resistance such as a rock or the like engaged by the teeth as they rotate.

Means carried by head assembly 13 and movable therewith serve to maintain the spacing between axle 47 and the turf so as to establish the degree to which the teeth 52 of comb units 51 enter the foliage thereof.

Thus, head assembly 13 carries each of two rollers 54 by means of a yoke 56 supported at pivot points 57. Rollers 54 are journalled at their ends in the downwardly depending journal plates 58. In addition, means are provided for selectively extending the rollers downwardly in varying degree relative to the plane of the vacuum head assembly and in a manner providing a rigid connection between the head assembly and the axis of rotation of the rollers. Thus, turn-buckles 59 are connected at their lower ends to yokes 56 and at their upper ends to an upwardly extending fin-like member 61 rigidly welded to and made a portion of the top of housing 18. The opposite ends of turn-buckles 59 include ball joints 62 in order to permit a limited degree of twisting movement of yokes 56 relative to head assembly 13.

Means for rotating axle 47 selectively in opposite directions serves respectively to provide a sweeping movement as shown in FIG. 10 or a renovating movement as shown in FIG. 11 for renovating the turf by means of comb units 51.

Thus, as shown in FIG. 9 hydraulic motor means 42 coupled by means of a timing belt 64 drives a gear 66 connected to rotate with axle 47.

A mounting arm 67 pivotally supports motor 42 from the pivot 68. A compression spring 69 disposed between a frame portion 71 and a mounting arm extension 72 serves to urge mounting arm 67 upwardly in order to remove slack from belt 64. Adjustable means such as the retaining nut 73 serves to adjust the compression of spring 69.

A flow passage in the form of the port 74 formed through the top surface of compartment 44 serves to direct the vacuum into compartment 44 from the inlet side of fan assembly 17. The flexible conduit 19 is coupled at its lower end to the bead formed around port 74 and at its upper end to the back wall of the housing of fan assembly 17. A fan 39 within assembly 17 is belt driven by means of belt 76 trained about the pulleys 77, 78. A safety shield 79 covers belt 76, pulley 78 and a major part of pulley 77.

Means supporting head assembly 13 from chassis 11 so as to permit head assembly 13 to rise and fall in terrain-following movement substantially unaffected by upward movements of wheels 12 (and chassis 11) include the carriage arrangement shown best in FIG. 4.

Parallel arms 81, 82, pivoted at their ends, extend between brackets 83, 84 forming part of the chassis 11 and a fixed part of head assembly 13 such as the fins 61. Ball joint connections at the end of arms 81, 82 permit head assembly 13 to twist about its direction of movement relative to chassis 11 as represented by arrow 80. Means for relieving a substantial amount of the weight of assembly 13 from the turf to permit assembly 13 to be readily responsive to changes in the terrain and follow these changes closely includes the elongate links 86 extending upwardly from head assembly 13 toward chassis 11 and spring means such as the compression springs 87 which serve to urge links 86 upwardly tending to lift head assembly 13 so as to relieve some of the weight of assembly 13 from riding on the turf.

The bottom end of each of the compression springs 87 is seated within a hollow cylindrical boss 90 welded to a transversely extending strip 95 secured to rigid members of chassis 11. A cylindrical sleeve 100 encloses spring 87 and adjusting nuts 104, threaded onto the upper end of link 86 serve to adjust the compression of spring 87. Link 86 extends upwardly through an opening in the transverse strip 95 to permit spring 87 to urge link 86 upwardly therethrough against the weight of head assembly 13 serving to compress spring 87. Accordingly, the degree of lifting introduced by spring 87 can be readily adjusted by nuts 104.

From the foregoing it should be readily evident that head assembly 13 is arranged to rise and fall on each side of the center-line of movement. Accordingly, a stabilizing arm 88 or "wander" bar is pivotally coupled to the center trailing end of assembly 13 and to the underside of chassis 11 at pivot point 89 to prevent head assembly 13 from tending to "steer" itself out of the direction of movement.

As shown best in FIG. 4 any bumps and irregularities in the surface, such as rocks or the like or otherwise encountered by wheels 12 on one side or the other of chassis 11, provides upward movement as in the direction of arrow 91 to tip chassis 11 to one side or the other. Assuming, for example, that the left wheel 12 engages a boulder so as to lift the left side of chassis 11 it is to be observed that bracket 83 will rise with the lifting of the chassis. However, parallel arms 81 will serve to permit the left side of head assembly 13 to maintain its position without being lifted. As the left side of chassis 11 moves upwardly the spring 87 located on that side will be drawn downwardly by the downward movement of link 86 against the compression of spring 87.

Further, as head assembly 13 dips on one side or the other relative to chassis 11 so as to follow the contour of the field, wander bar 88 maintains a proper directional orientation of head assembly 13 so that it continuously points directly ahead.

As noted above the spacing between the underside of housing 18 and the top of the turf is maintained by means of adjusting turn-buckles 59 so as to raise or lower rollers 54.

Means for hoisting the entire head assembly 13 upwardly to a degree sufficient to safely permit the vehicle to be driven at great speed when not in operation is diagrammatically shown in FIG. 3 whereby yieldable means, such as the cables 91, serve to couple head assembly 13 with hoisting means such as the piston 92 for lifting head assembly 13 between lowered and raised positions. By use of cables 91 head assembly 13 is permitted to rise and fall in terrain following movement while the hoisting arrangement remains continuously engaged to head assembly ready for lifting. In short, if mechanical linkages were to be employed in an arrangement of the kind described it would be necessary for them to be coupled and de-coupled from time to time as it is desired to move the vehicle from one field to the next.

The particular construction shown in FIGS. 5 and 6 includes the double acting piston 92 welded at its base end to a mounting plate 93. A piston rod 94 is secured at its outer end to a cable plate 96 which serves to connect the ends of cables 91 thereto, as by means of standard wedged tube cable anchors 85.

Cable plate 96 carries a support roller 97 which rides along and is supported by the upper surface of cross-brace 98. Of the two cables 91 the near cable as viewed in FIG. 5 is reeved across a pulley 99 to pass downwardly to be connected to a fastener located at the top surface of housing 18. The other cable 91 is reeved about a pulley 101 and trained backwardly along the stretch 91a (FIG. 6) passing above its associated point of connection 102 in plate 96 and then reeved around another pulley 103 to pass downwardly to be connected to the top of housing 18 at a position spaced apart and on opposite sides of the center-line of the path along which assembly 13 is being moved from the point of connection of the other cable housing 18.

As thus arranged assembly 13 can be hoisted upwardly to the extent of the stroke of piston 92 at anytime since there remains a continuous connection between piston 92 and head assembly 13. However, in following the terrain surface the upward movements of head assembly 13 will not cause any interference with the operation of piston 92 in view of the fact that cables 91 are yieldable.

As vehicle 10 is drawn back and forth across a field a distinct advantage is achieved if the pulling vehicle such as tractor 106 can make extremely sharp turns so as to permit the vehicle to transverse the field substantially adjacent paths. The foregoing has been achieved by the arrangement as now to be described. Initially, a drive means for rotating the grooming means on axle 47 includes hydraulic motor 42 and hydraulic pump 41. A fan 39 mounted upon shaft 108 supplies a vacuum to head assembly 13. A power take-off drive coupling 109 inter-connects a power take-off output 111 of tractor 106 with the end of a drive shaft 110 which operates both the fan and hydraulic pump in common. Accordingly, shaft 110 is journalled to carry pulley 77 thereon and a cylindrical coupling 112 which engages a stub shaft 113 of pump 41.

As thus arranged, power take-off coupling 109 drives both hydraulic motor means (including pump 41) and the fan 39 carried on shaft 108, from a single drive input common to operate both.

Means for adjustably mounting pump 41 to dispose stub shaft 113 in alignment with coupling 112 includes the transversely extending angle bar 115 mounted to extend transversely upon the upper surface of chassis 11. A support plate 129 formed with a vertically oriented slot 131 is bolted onto the fact of pump 41. A bolt 132 and associated retaining nut threaded thereon passes through slot 131, through the resilient "pad" or washer 133, and then through the upper flange of bar 115 so as to be able to tighten securely against plate 129 to hold plate 129 in a given position. The purpose of the resilient pad or washer 133 is to accommodate for very small shifts in alignment which may occur in the event that plate 129 has not been precisely registered with respect to supporting shaft 113 within coupling 112.

Means are provided whereby extremely sharp turns can be made while pulling the turf grooming vehicle. Chassis 11 includes a tongue 113 having a bi-furcated towing hitch at its forward end adapted to be coupled by means such as the bolt 116 to a trailer hitch 117 extending rearwardly of the towing vehicle or tractor 106.

Coupling 109 of known construction lies adjacent tongue 113 and substantially in a vertical plane 35 including both tongue 113 and coupling 109. The leading end of coupling 109 includes a double universal unit 118 formed with a pair of U-shaped brackets 118a, 118b each of which carries a coupling pin 119, 121 coupled to associated U-shaped brackets, one of which is the power take-off output 111 of towing vehicle 106. The other is a bracket 122 carried on the leading end of coupling 109.

Coupling 109 carries a single universal unit 123 at its trailing end for driving shaft 110.

In view of the fact that towing hitch 117 of tractor 106 typically must extend rearwardly beyond the point of connection to the power take-off, such as 111, since it is not usually practical to locate the end of a drive shaft such as 110 at a position immediately over the pivot point such as defined by the bolt 116, it is readily evident that the power take-off 111 and universal unit 123 will be located at positions other than at a position immediately over pivot points between the two vehicles.

As shown best in FIG. 13 as a corner is turned by the towing vehicle 106 coupling 109 extends by virtue of the extensible means interposed between its ends so as to permit the length of the coupling to be extended and contracted as it continues to rotate to permit continuous operation thereof as the chassis is towed through sharp turns by the towing vehicle and thereby avoid the need to specially sweep the ends of the rows where turning has required sweeping to stop. Accordingly, coupling 109 includes internal telescoping portions 124, 126 and external telescoping portions 127, 128.

In operation, rotation of axle 47 in a direction corresponding to the direction of rotation of the wheels of vehicle 10 (as shown in FIG. 10) serves to provide a sweeping action for removing loose turf material from the field. The rate of rotation of axle 47 is greater than the rate of rotation of wheels 12, however, and this serves to discharge the loosened material upwardly into the air as shown in FIG. 10 for entrainment in the air flow at the suction side of fan assembly 17.

When it is desired to renovate the turf, axle 47 is moved closer to the ground by shortening turn-buckles 59 and reversing rotation of axle 47 by means of reversing connections 105a, 105b to hydraulic motor 42 as represented in FIGS. 12 and 15. Accordingly, pump 41, as above described, provides an output via fluid connection 105a and a return fluid connection via 105b a suitable control valve 120 is movable between two positions, one of which is shown whereby the output fluid connection 105a discharging fluid under pressure is connected via valve 120 to motor 42 along line 134. The discharge from motor 42 passes along hydraulic line 136 to return via valve 120 to fluid connection 105b at the suction side of pump 41. The rotation of motor 42 can readily be reversed simply by reversing the condition of valve 120 so that fluid connection 105a from the output of pump 41 is connected to discharge into hydraulic line 36 while fluid connection 105b is connected to hydraulic line 134. This can be achieved by rotating the core of valve 120 90° counterclockwise as shown.

Finally, means for easily tightening belt 76 for the convenience of the operator of the equipment when they are located at a remote position from a repair facility, such as when operating in the middle of a field, comprises a journal box 137 carried in the leading end of chassis 11 and fixed thereto. Circular openings 138 are formed through each end of box 137 and aligned on a common axis. A cylinder 139 is supported for rotation within box 137 by the bounding edges of openings 138. Bearings carried in the ends of cylinder 139 serve to support drive shaft 110 for rotation. As noted above, a drive pulley 77 is carried on shaft 110 for cyclically moving belt 76.

Bearings 141 aligned with each other on a common axis are disposed slightly off-center relative to the center of cylinder 139. Accordingly, means for rotating cylinder 139 about its axis of rotation within journal box 137 serves to move bearings 141 (and shaft 110 therein) in a path eccentric to the axis defined between the openings 138. In this manner shaft 110 is moved with the bearings between radially advanced and retracted positions relative to drive pulley 78 mounted upon shaft 108. In this way the spacing between shafts 108, 110 and/or pulleys 77, 78 is decreased or increased in order to slacken or tighten belt 76.

Means for rotating cylinder 139 within journal box 137 includes a level arm 142 formed integral with and to extending radially away from an otherwise annular plate 143 bolted to the leading end of cylinder 139 in overlapped relation with respect to end surface of box 137. Another annular plate 144 bolted to the other end of cylinder 139 is held by fastening means such as tightening bolts 146 draws plates 143, 144 toward each other to secure engagement between plates 143, 144 and their respective end surfaces of box 137. Thus, bolts 146 serve to retain plates 143, 144 in position for tightening against the ends of box 137. In the position shown, use of the lever arm 142 can readily be employed to rotate cylinder 139 to move the axle of rotation of shaft 110 between advanced and retracted radial positions as desired so as to tighten or slacken belt 76. When the correct position is reached means are provided for retaining the adjusted spacing between shafts 108, 110. Thus, the displacement between the outer end surfaces of cylinder 139 is slightly less than that between the outer end surfaces of box 137 whereby upon drawing plates 143, 144 toward each other by means of bolts 146, plates 143, 144 first engage an associated end surface of box 137 with plates 143, 144. By tightly engaging the ends of box 137 further rotation of cylinder 139 is clearly prevented and, accordingly, further movement or adjustment of the spacing between pulleys 77, 78 (or between shafts 108, 110 upon which they ride) is also prevented.

From the foregoing it should be readily evident that there has been provided an improved turf grooming vehicle in which cyclically rotating turf grooming means is carried in a vacuum head assembly supported for terrain-following movement substantially independent of other upward movements introduced to the chassis. In addition, a turf grooming vehicle is disclosed in which the grooming vehicle can be towed around relatively sharp corners so as to limit the amount of lost movement of the vehicle while on a given field of turf.

Further as disclosed above it is readily evident that there is provided an improved turf grooming machine whereby much handling of the clippings or other loose turf material is minimized by employing a receiver bin, mounted to dump over the side of trucks standing alongside the vehicle. Further, the improved turf grooming arrangement as disclosed above is readily converted to a turf renovating machine simply by adjusting the turn-buckles 59 so as to lower the head assembly somewhat and then reversing the rotation of shaft 47 by means of changing the condition of hydraulic valve 120.

Finally, the convenience of the above construction is enhanced by ensuring an ability to maintain the drive belts properly tightened by use of no more than a wrench to release bolts 146 and then to re-tighten plates 143, 144 against the ends of journal box 147.

What is claimed is:

1. In a turf grooming vehicle, a mobile chassis of a type adapted to be moved across a field of turf, wheels supporting said chassis to cause said chassis to rise and fall in terrain-following movement with the vertical movement of the wheels, grooming means including a vacuum head assembly including vacuum means serving to apply vacuum to the turf for removing loose turf material therefrom, said assembly including means supporting said vacuum means to rise and fall in terrain-following movement substantially unaffected by the vehicle movements of said wheels while maintaining said vacuum means substantially at a predetermined spaced relation to said turf, said head assembly being coupled to be drawn by said chassis, said means supporting said vacuum means comprises rollers carried by said head assembly for engaging the turf and supporting said vacuum means in spaced relation therefrom, and means for adjusting the clearance of said vacuum means with respect to the turf comprising U-shaped mounting yokes carrying said rollers to roll in supporting engagement across the turf, the ends of said yokes being pivoted to said head assembly, and a turn-buckle extending between said assembly and a portion of said yoke for adjusting the clearance beneath said head assembly.

* * * * *